(12) United States Patent
Awau (10) Patent No.: US 12,447,320 B2
(45) Date of Patent: Oct. 21, 2025

(54) INDWELLING DEVICE FOR TREATING FLORA AND METHOD FOR TREATING FLORA

(71) Applicant: OLYMPUS CORPORATION, Tokyo (JP)

(72) Inventor: Yumiko Awau, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 1101 days.

(21) Appl. No.: 17/404,266

(22) Filed: Aug. 17, 2021

(65) Prior Publication Data

US 2021/0379346 A1   Dec. 9, 2021

Related U.S. Application Data

(63) Continuation of application No. PCT/JP2020/005861, filed on Feb. 14, 2020.

(60) Provisional application No. 62/808,365, filed on Feb. 21, 2019.

(51) Int. Cl.
| | |
|---|---|
| *A61M 31/00* | (2006.01) |
| *A61B 1/015* | (2006.01) |
| *A61B 1/31* | (2006.01) |
| *A61H 21/00* | (2006.01) |
| *A61K 35/00* | (2006.01) |
| *A61K 35/741* | (2015.01) |

(52) U.S. Cl.
CPC ............ *A61M 31/00* (2013.01); *A61B 1/015* (2013.01); *A61B 1/31* (2013.01); *A61H 21/00* (2013.01); *A61K 35/741* (2013.01); *A61H 2201/105* (2013.01); *A61K 2035/115* (2013.01); *A61M 2210/1064* (2013.01)

(58) Field of Classification Search
CPC ..................................................... A61M 31/00
See application file for complete search history.

(56) References Cited

U.S. PATENT DOCUMENTS

| | | | |
|---|---|---|---|
| 2003/0147857 A1* | 8/2003 | Monte | A61K 35/745 424/93.4 |
| 2013/0022575 A1* | 1/2013 | Cassity | C12N 1/20 435/252.4 |
| 2014/0276407 A1 | 9/2014 | DeVries et al. | |
| 2018/0000875 A1 | 1/2018 | Leyer et al. | |

(Continued)

FOREIGN PATENT DOCUMENTS

| | | |
|---|---|---|
| CN | 109661250 A | 4/2019 |
| JP | H05-207846 A | 8/1993 |
| JP | 2008-540521 A | 11/2008 |

(Continued)

OTHER PUBLICATIONS

FDA Warns of One Death Linked to Fecal Transplants (https://www.raps.org/news-and-articles/news-articles/2019/6/fda-warns-of-one-death-linked-to-fecal-transplants).

(Continued)

*Primary Examiner* — Dung T Ulsh
(74) *Attorney, Agent, or Firm* — Scully, Scott, Murphy & Presser, P.C.

(57) ABSTRACT

An indwelling device for treating flora includes probiotics, a carrier carrying the probiotics and including a first region arranged in an appendico and a second region arranged in an intestinal cecum, in which the probiotics are carried in the first region and the second region contains an antibacterial agent.

9 Claims, 11 Drawing Sheets

(56) References Cited

U.S. PATENT DOCUMENTS

2019/0290314 A1   9/2019   Gemer et al.
2020/0289804 A1   9/2020   Awau et al.

FOREIGN PATENT DOCUMENTS

| JP | 2013-505289 A | 2/2013 |
| JP | 2019-520920 A | 7/2019 |
| KR | 10-2014-0118348 A | 10/2014 |
| WO | 2006/124021 A1 | 11/2006 |
| WO | 2018/008020 A1 | 1/2018 |
| WO | 2020/170981 A1 | 8/2020 |

OTHER PUBLICATIONS

R. Randal Bollinger, et al., "Biofilms in the large bowel suggest an apparent function of the human vermiform appendix", Journal of Theoretical Biology 249 (2007), pp. 826-831.
International Search Report dated May 19, 2020 received in PCT/JP2020/005859.
International Search Report dated Mar. 24, 2020 received in PCT/JP2020/005861.

\* cited by examiner

FIG. 15

INDWELLING DEVICE FOR TREATING FLORA AND METHOD FOR TREATING FLORA

This application is a continuation application of PCT/JP2020/005861 filed on Feb. 14, 2020 and claims benefit of U.S. Provisional Patent Application No. 62/808,365 filed in the U.S.A. on Feb. 21, 2019, the entire contents of which are incorporated herein by this reference.

BACKGROUND OF THE INVENTION

1. Field of the Invention

The present invention relates to an indwelling device for treating flora and a method for treating flora for improving enteric environment.

2. Description of the Related Art

A method for improving enteric environment by orally taking probiotics is known, as disclosed in, for example, US2018/0000875.

SUMMARY OF THE INVENTION

An indwelling device for treating flora according to an embodiment of the present invention for attaining the above object includes probiotics, and a carrier carrying the probiotics and including a first region arranged in an appendico and a second region arranged in an intestinal cecum, wherein the probiotics are carried in the first region and the second region contains an antibacterial agent.

The indwelling device for treating flora according to another embodiment of the present invention includes probiotics arranged in an appendico such that at least a part of the probiotics is in contact with an inner surface of the appendico, and a cover arranged on the inner surface of the appendico so as to cover the probiotics.

A method for treating flora according to an embodiment of the present invention includes inserting an endoscope into a subject and introducing the indwelling device for treating flora in the appendico by use of the endoscope.

A method for treating flora according to another embodiment of the present invention includes inserting an endoscope into a subject, supplying probiotics into the appendico by use of an endoscope such that at least part of the probiotics is into contact with an inner surface of the appendico, and introducing a cover into the appendico by use of the endoscope to cover the probiotics with the cover.

DETAILED DESCRIPTION OF THE PREFERRED EMBODIMENTS

Embodiments of the present invention will be described with reference to the accompanying drawings.

First Embodiment

Figure 1:
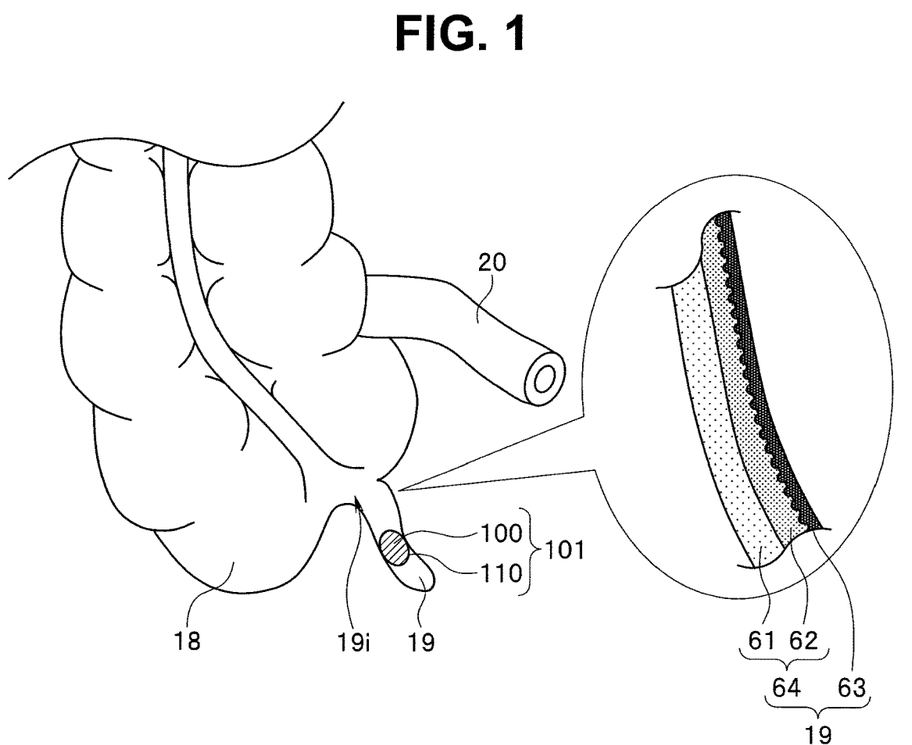
FIG. 1 is a diagram showing an example of an indwelling device for treating flora according to a first embodiment placed in the appendico.

FIG. 1 shows an example of an indwelling device for treating flora according to a first embodiment placed in the appendico. As shown in FIG. 1, an indwelling device 101 for treating flora according to the present invention has probiotics 100 and a carrier 110 carrying the probiotics 100 and is placed in the appendico 19.

The indwelling device 101 for treating flora is flexible gel or solid.

In the present invention, the probiotics 100 refer to at least one type of microorganism bringing a beneficial effect to living bodies. Examples of the beneficial effect herein include an improvement of enterobacterial flora and an effect on the intestinal immune system.

A bacterium called as a bad bacterium or opportunistic bacterium by itself is included in probiotics as long as the bacterium brings a beneficial effect.

Examples of the probiotics include, but are not particularly limited to, bacteria belonging to phylum Bacteroidetes, phylum Firmicutes, phylum Actinobacteria and phylum Proteobacteria.

If the bacteria mentioned above are used, they may be used singly or in combination.

If bacteria are used in combination, the type, amount and ratio of bacteria can be appropriately selected depending on the production, storage, therapeutic purpose, and the like.

If the probiotics 100 are alive in the carrier 110 and can undergo cell division, the type of carrier 110 is not particularly limited. If the whole indwelling device 101 for treating flora is arranged in the appendico 19, as shown in FIG. 1, it is preferable that the carrier 110 should have bio-absorbability.

Examples of the bioabsorbable carrier 110 include starch and mucin. Since mucin is contained also in mucosal fluid 64, containing mucin in the carrier 110 has an advantage that the probiotics 100 is easily incorporated in the mucosal fluid 64. The moisture content and molecular weight of mucin are not particularly limited and can be appropriately selected in accordance with, e.g., the probiotics 100 to be used and the state of the appendico 19 of a subject.

The carrier 110 may contain not only the probiotics 100 but also a mucosal fluid degrading bacterium that can degrade the mucosal fluid 64 (bacterium producing an enzyme degrading mucosal fluid).

A symbiotic bacterium capable of producing an enzyme degrading mucosal fluid is added to the probiotics, the rate of the desired bacterium to be colonized to a subject can be improved.

Examples of the bacterium producing an enzyme degrading mucosal fluid include *B. bifidum, C. perfringens, B. longum* subsp. *Longum* and *B. breve*.

Using the probiotics 100 and the mucosal-fluid degrading bacterium obtained by artificial culture has an advantage that impurities are rarely contained.

The carrier 110 may contain a nutrient for the probiotics 100. As the nutrient, at least one selected from the group consisting of ferrous sulfate, manganese sulfate, magnesium sulfate, sodium acetate, ammonium citrate, potassium dihydrogen phosphate, glucose, tryptone, yeast, lactic acid bacteria, butyric acid bacteria, and bifidobacteria, is mentioned. Containing a nutrient in the carrier 110 has an advantage that probiotics 100 easily proliferate.

If the indwelling device 101 for treating flora is solid or gel having a hardness sufficient to maintain the shape under gravity, the shape of the device is not particularly limited and appropriately selected in accordance with the intended use of the device. For example, the shape may be a cylinder or a sphere such that the device is easily inserted into the tubular appendico or may be a rectangular column or a polygonal sphere such that the device is easily held by a treatment tool.

The surface of the indwelling device 101 for treating flora may be smooth or at least partly rough. If the surface of the indwelling device 101 for treating flora is rough, part of the appendiceal mucosal fluid can be removed by the rough portion when the indwelling device 101 for treating flora is inserted into the appendico. Thus, the device can also serve as a mucous membrane remover described later. When the indwelling device 101 for treating flora has a rough surface, the difference in height of the rough surface is preferably 1 mm or less, more preferably 0.7 mm or less; and preferably 0.1 mm or more.

According to the constitution of the indwelling device 101 for treating flora, the probiotics 100 can be supplied alive to the appendico 19, which resists to effects of excretion.

Another Example of the First Embodiment

Figure 2:
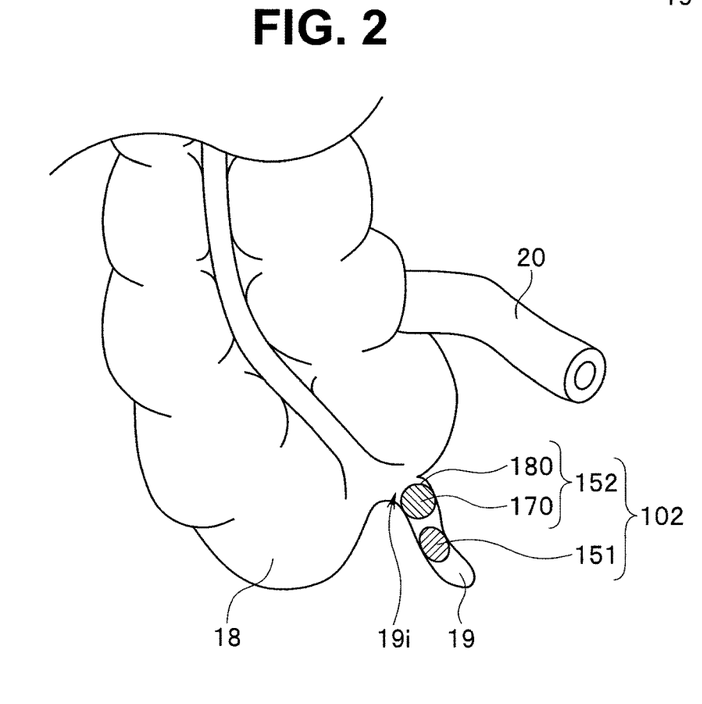
FIG. 2 is a diagram showing another example of the indwelling device for treating flora, which contains a first indwelling device and a second indwelling device and placed in the appendico.

FIG. 2 shows another example of the indwelling device for treating flora, which contains a first indwelling device and a second indwelling device and placed in the appendico.

In the example, an indwelling device 102 for treating flora contains a first indwelling device 151 and a second indwelling device 152.

The first indwelling device 151, which is placed deep inside the appendico 19 away from an appendiceal opening 19i, is the same as the indwelling device 101 for treating flora according to the first embodiment, as described above.

In the second indwelling device 152, which is placed closer to the appendiceal opening 19i as an exit of the appendico 19 than the first indwelling device 151, it is preferable that a carrier 180 should contain an antibacterial agent 170.

Arrangement of the second indwelling device 152 closer to the appendiceal opening 19i in the appendico 19 having a reduced number of indigenous bacteria has an advantage that the probiotics 100 can proliferate in the appendico 19 while preventing inflow of indigenous bacteria from the intestinal cecum 18.

The material for the second indwelling device 152 is the same as the material of the first indwelling device 151. If the second indwelling device 152 has a higher bioabsorption rate than that of the first indwelling device 151, there is an advantage that the probiotics 100 sufficiently proliferated easily migrate from the appendico 19 to the intestinal cecum 18. Examples of a method for facilitating the bioabsorption rate include a method of reducing the mass, a method of reducing molecular weight, and a method of reducing degree of crosslinkage of the second indwelling device 152 compared to that of the first indwelling device 151.

The first indwelling device 151 and the second indwelling device 152 are separately arranged in FIG. 2. The devices 151 and 152 may be arranged adjacent to each other or connected with a connecting member interposed between them.

Figure 3:
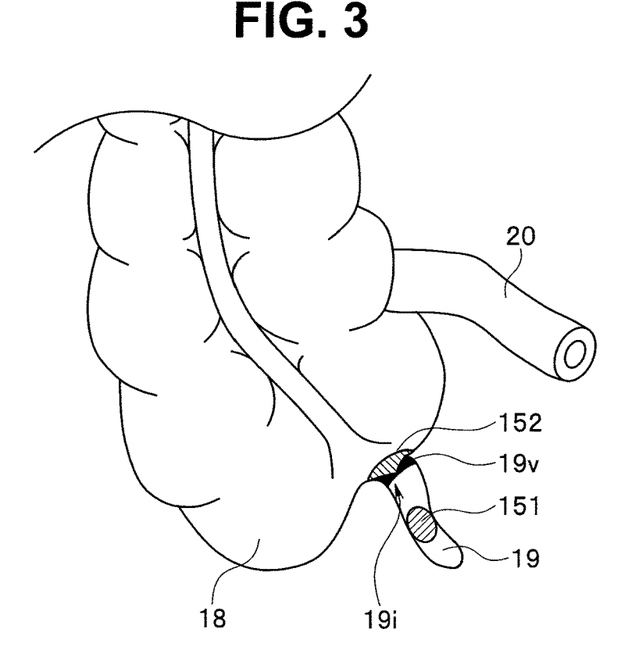
FIG. 3 is a diagram showing another example of the second indwelling device shown in FIG. 2, which is placed on the surface of the appendiceal valve.

FIG. 3 shows another example of the second indwelling device shown in FIG. 2, which is arranged on the surface of the appendiceal valve.

As shown in FIG. 3, when the appendiceal opening 19i is closed by an appendiceal valve 19v, the second indwelling device 152 may be arranged on the surface of appendiceal valve 19v facing the intestinal cecum 18.

Second Embodiment

In the first embodiment, the case where the indwelling devices 101 and 102 for treating flora are all arranged in the appendico 19. The arrangement of indwelling devices is not limited to the above case. The indwelling devices for treating flora may partly be exposed in the intestinal cecum 18.

Figure 4:
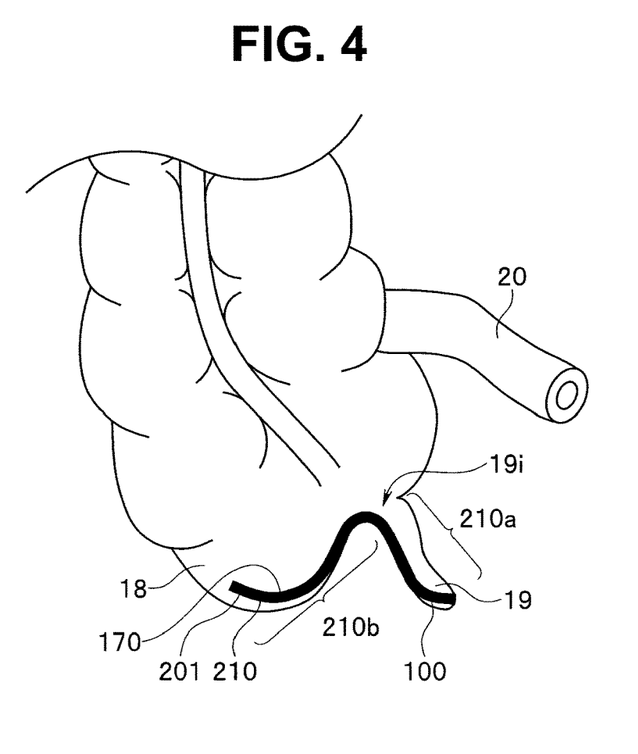
FIG. 4 is a diagram showing an example of an indwelling device for treating flora according to a second embodiment, which is arranged in from the appendico to the intestinal cecum.

FIG. 4 shows an example of an indwelling device for treating flora according to a second embodiment, which is placed in from the appendico to the intestinal cecum.

As shown in FIG. 4, a carrier 210 of a thread-like indwelling device 201 for treating flora includes a first region 210a to be arranged in the appendico 19 and a second region 210b to be arranged in the intestinal cecum 18.

The first region 210a contains the probiotics 100. It is preferable that at least the first region 210a should be porous or have a rough surface that can carry the probiotics 100.

Examples of a material for realizing the porous texture or rough surface include a sponge and a fiber. Examples of the sponge include urethane sponge, rubber sponge and *Spongia officinalis*. Examples of the fiber include plant fibers such as a cotton thread or a linen thread; and animal fibers such as silk, wool, mohair, cashmere, camel, llama, alpaca, vicuna, angora, dog, cat, spider thread or human hair. The fiber may be processed into non-woven fabric, thread, string or net-like form.

At least, the first region 210a may contain a nutrient for the probiotics 100.

The second region 210b may contain the antibacterial agent 170 or may be formed of an antibacterial material.

Owing to the antibacterial substances, it is possible to prevent suppression of proliferation of the probiotics 100 in the first region 210a by indigenous bacteria of the intestinal cecum 18. Examples of the antibacterial material include an indwelling material such as a suture thread known in the technical field.

The first region 210a and the second region 210b may be formed of the same or different material. The first region 210a and the second region 210b may be formed of the same material but different in molecular weight or degree of crosslinkage.

Conversely, the probiotics 100 may be contained in the second region 210b. Alternatively, the device may be designed such that the probiotics 100 proliferated in the first region 210a can migrate into the second region 210b. The latter case has an advantage that the probiotics 100 that migrate from the second region 210b into the intestinal cecum 18 act on the Peyer's patches on the inner surface of the intestinal cecum 18.

When an indigestible material is used as the carrier to be arranged in the first region 210a, providing a portion (the second region 210b) to be exposed in the intestinal cecum 18 has an advantage that the carrier 210 is evacuated in a predetermined period without remaining in the intestine.

In FIG. 4, the second region 210b is arranged in the intestinal cecum 18. The present invention is not limited to the arrangement. The second region 210b may be extended to parts 15 to 17 of the colon, the rectum 13 or the anus 11 (see, FIG. 9).

Another Example of the Second Embodiment

Figure 5:
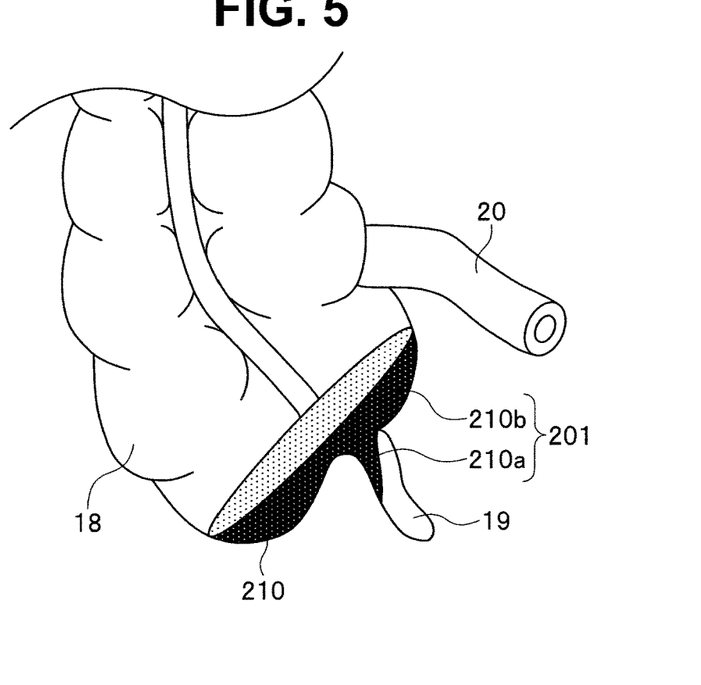
FIG. 5 is a diagram showing another example of the indwelling device for treating flora shown in FIG. 4, which has a tapered shape in the intestinal cecum.
Figure 6:
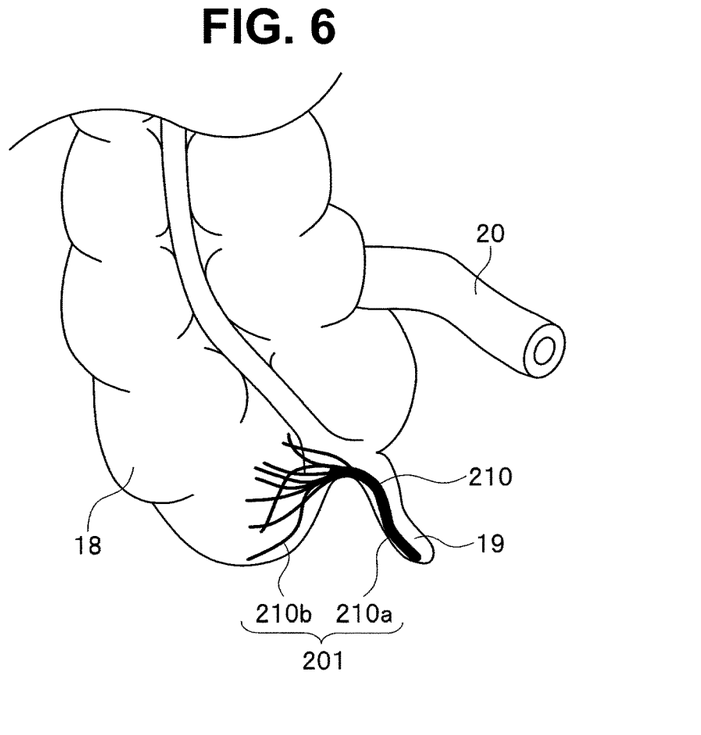
FIG. 6 is a diagram showing another example of the indwelling device for treating flora shown in FIG. 4, which has fringes in the intestinal cecum.

FIG. 5 shows another example of the indwelling device for treating flora shown in FIG. 4, which has a tapered shape in the intestinal cecum. FIG. 6 shows another example of the indwelling device for treating flora shown in FIG. 4, which has fringes in the intestinal cecum.

In the second embodiment mentioned above, the indwelling device 201 for treating flora has a thread-like shape, but the device 201 may have a shape spreading toward the intestinal cecum 18, as shown in FIG. 5 and FIG. 6.

As shown in FIG. 5, the second region 210b of the indwelling device 201 for treating flora may have a tapered shape in the intestinal cecum 18. As shown in FIG. 6, the second region 210b of the indwelling device 201 for treating flora may have a fringe-like shape.

Third Embodiment

Figure 7:
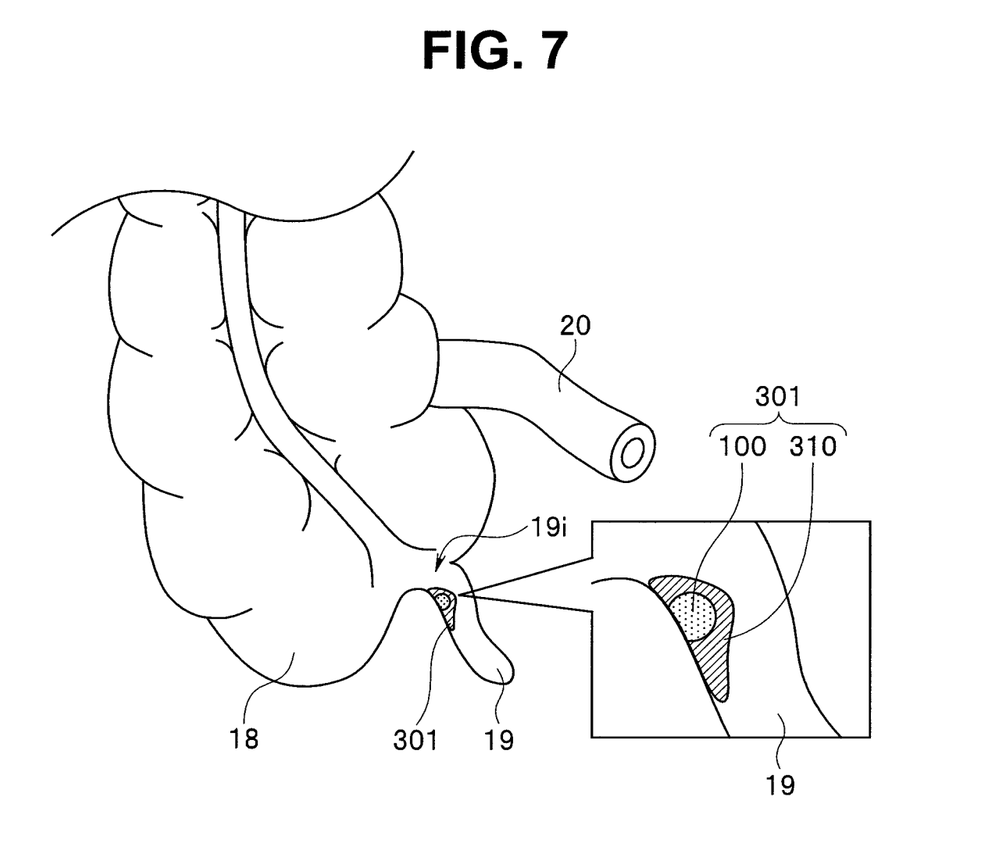
FIG. 7 is a diagram showing an example of an indwelling device for treating flora according to a third embodiment, which is placed in the appendico.

FIG. 7 shows an example of an indwelling device for treating flora according to a third embodiment, which is placed in the appendico.

As shown in FIG. 7, an indwelling device 301 for treating flora according to the third embodiment is formed of the probiotics 100 and a sheet-like cover 310 as a carrier covering the probiotics 100.

The cover 310 is arranged so as to cover the probiotics 100 arranged in the appendico 19 such that at least a part of the probiotics 100 is in contact with an inner surface of the appendico.

Using the cover 310 has an advantage that the indwelling device 301 for treating flora is less affected by indigenous bacteria or rarely evacuated.

The shape of the cover 310 is not particularly limited and can be appropriately selected depending on the advantage. The cover in the state of gel has an advantage that the cover is easily supplied through an endoscope 1 (see, FIG. 9). The cover 310 in the form of sheet has an advantage that the probiotics 100 are easily fixed on the cover.

Although the material for the cover 310 is not particularly limited, for example, the same material as used in the carrier 110 according to the first embodiment can be used.

Fourth Embodiment

A method for treating flora according to the present invention includes a step of inserting the endoscope 1 into a subject and a step of introducing the indwelling device 101, 102, 201 or 301 into the appendico 19, by use of the endoscope 1.

Figure 8:
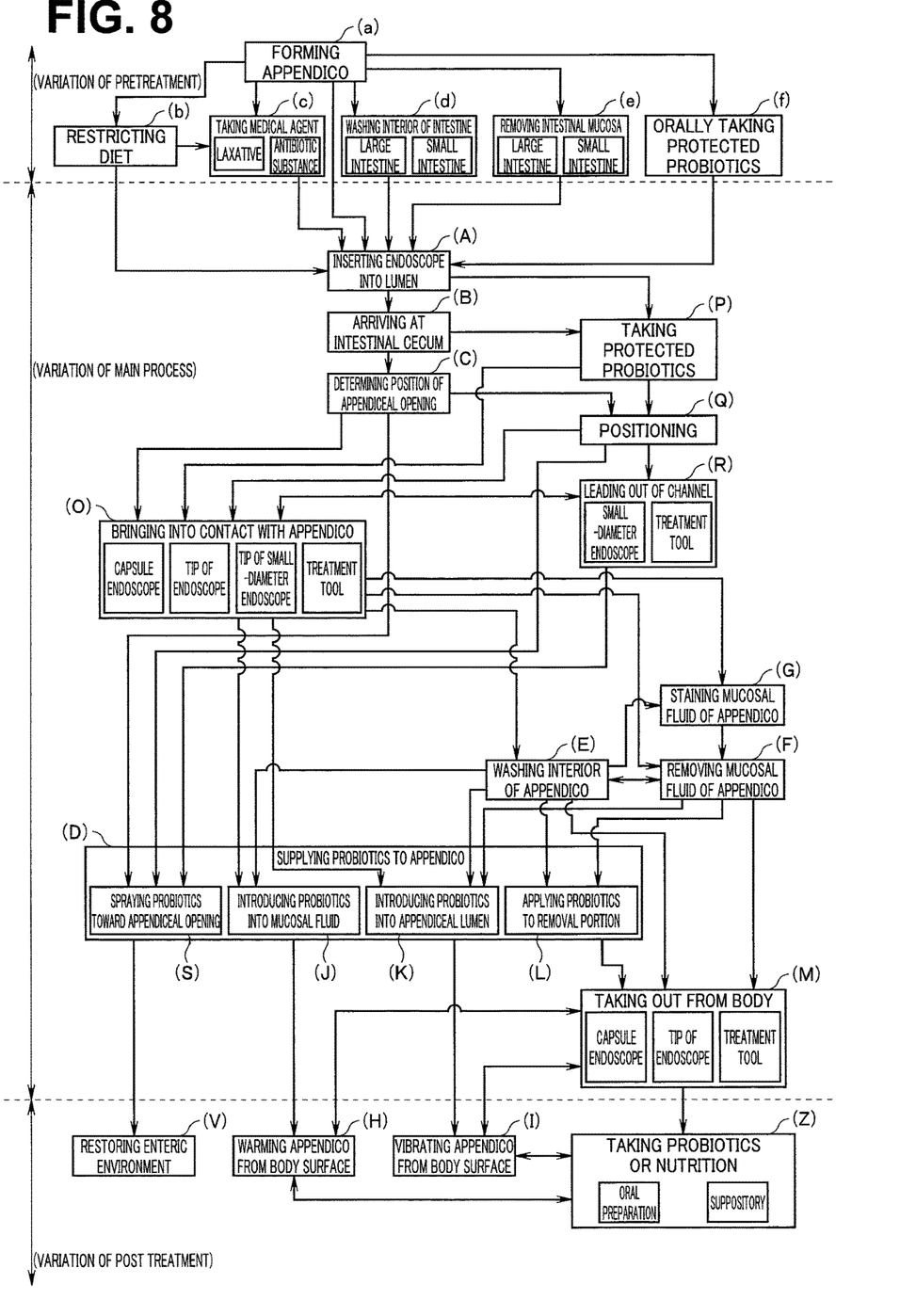
FIG. 8 is a flowchart for introducing an indwelling device for treating flora into the appendico in accordance with a method for treating flora of a fourth embodiment of the present invention.
Figure 9:
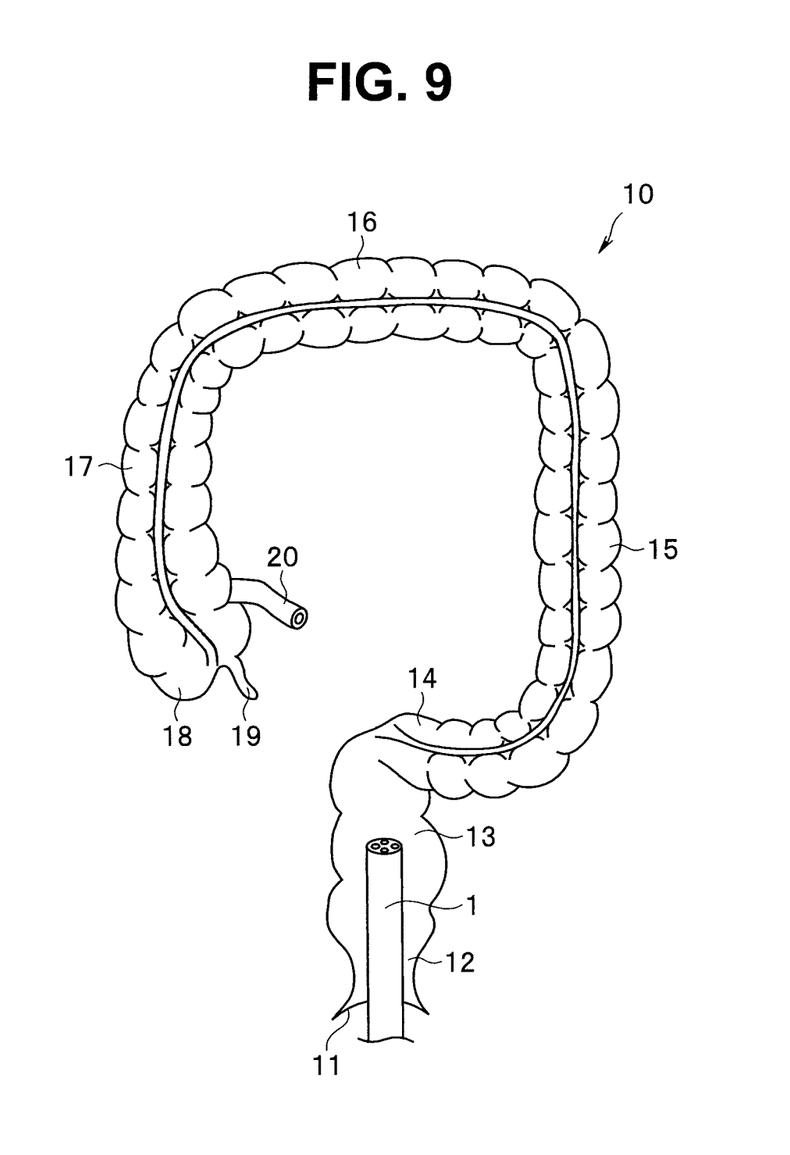
FIG. 9 is a diagram showing step (A) of FIG. 8.
Figure 10:
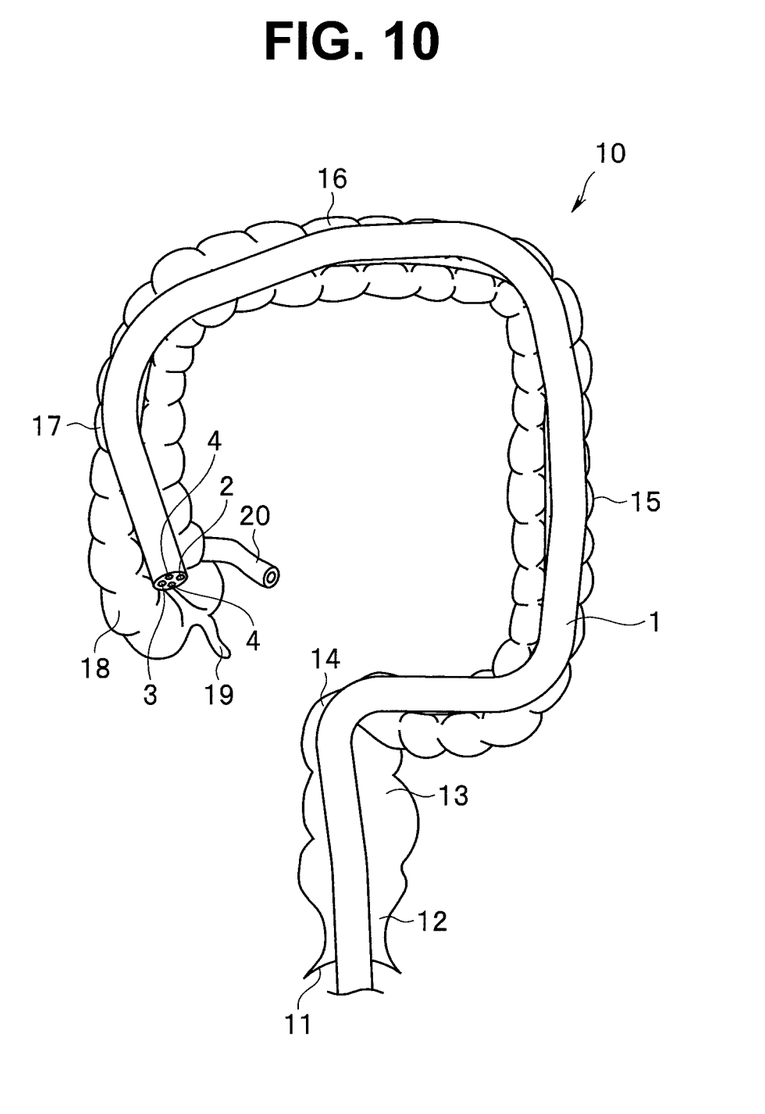
FIG. 10 is a diagram showing step (B) of FIG. 8.
Figure 11:
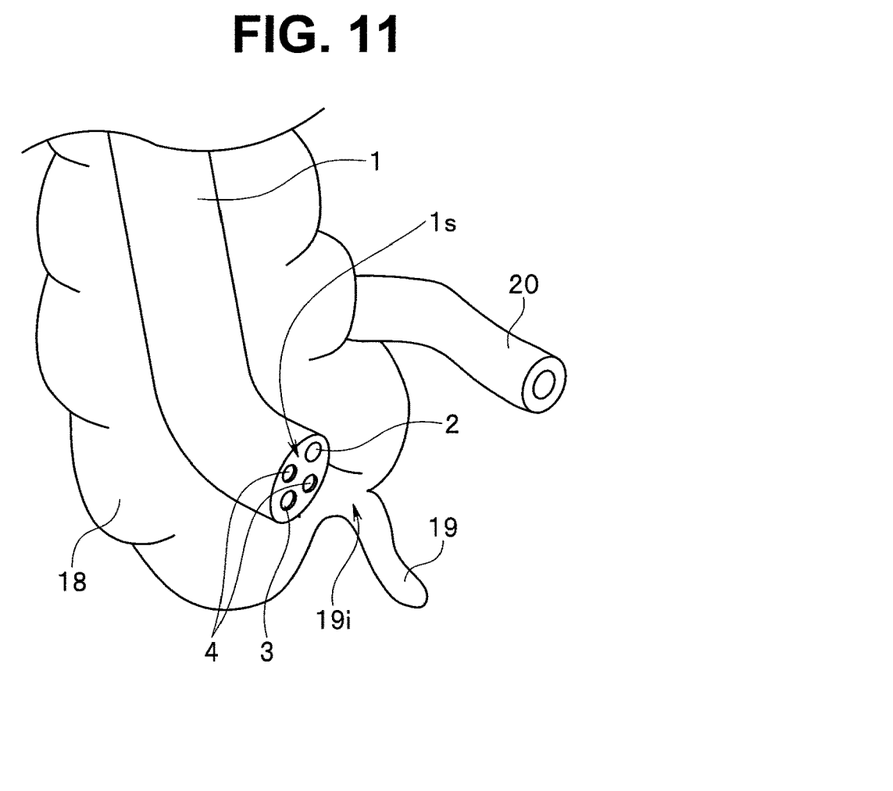
FIG. 11 is a diagram showing step (C) of FIG. 8.
Figure 12:
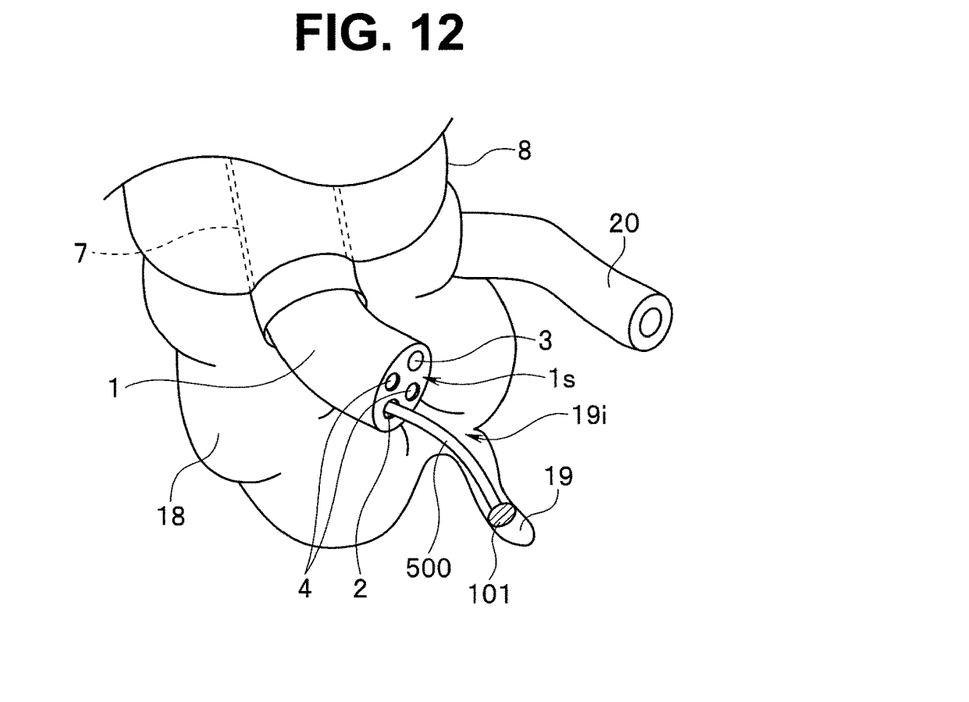
FIG. 12 is a diagram showing step (K) of FIG. 8.

FIG. 8 shows a flowchart for introducing an indwelling device for treating flora into the appendico in accordance with the method for treating flora of a fourth embodiment of the present invention. FIG. 9 shows step (A) of FIG. 8. FIG. 10 shows step (B) of FIG. 8. FIG. 11 shows step (C) of FIG. 8. FIG. 12 shows step (K) of FIG. 8.

In the fourth embodiment, step (A)→(B)→(C)→(D/K)→(M) are sequentially carried out to supply the indwelling device 101, 102, 201 or 301 for treating flora to the appendico 19, as shown in FIG. 8.

Needless to say, the flow of FIG. 8 shown below is not carried out in the alphabetical order.

In the first place, in step (A), the endoscope 1 is introduced into the lumen, as shown in FIG. 8.

The large intestine 10, at which the endoscope 1 arrives through the lumen, is generally constituted of lower rectum 12, upper rectum 13, sigmoid colon 14, descending colon 15, transverse colon 16, ascending colon 17, intestinal cecum 18, appendico 19 and ileum 20, sequentially from anus 11, as shown in FIG. 9.

(Step (A) of Introducing the Endoscope into Lumen)

In the present invention, the endoscope 1 may be introduced into the body via the oral route or the anal route (via anus 11) as shown in FIGS. 9 to 12.

In the present invention, the endoscope 1 may be a flexible endoscope or a capsule endoscope.

The flexible endoscope for the upper digestive system or for the lower digestive system may be used. The diameter of the flexible endoscope can be appropriately selected in accordance with the subject.

Although specifically described in the following examples for modified embodiments, the endoscope 1 may be used singly or in combination with a sheath having a channel through which the endoscope 1 is insertable; or a mother endoscope may be used in combination with a baby endoscope insertable through the channel of the mother endoscope.

The endoscope 1 and a treatment tool insertable through the channel 2 of the endoscope 1 may be used in combination. Alternatively, the endoscope 1 may be used in combination with a treatment tool attachable to the tip of the endoscope 1.

When a capsule endoscope is used, a guidance device for controlling movement and placement of the capsule endoscope, outside the body, may be used in combination.

In step (B), the endoscope 1 is allowed to arrive at the intestinal cecum 18, as shown in FIG. 10.

(Step (B) of Bringing Endoscope to the Intestinal Cecum)

Whether the endoscope 1 arrives at the intestinal cecum 18 is confirmed by looking through the field of view of an observation section 3 of the endoscope 1 under illumination light applied from, e.g., an illumination unit 4.

When the endoscope 1 is inserted through the lumen from the mouth or the anus 11, toward the intestinal cecum 18, a gas may be introduced into the lumen to expand the lumen.

When anaerobic bacteria are used as the probiotics 100 in the indwelling device 101, 102, 201 or 301 for treating flora, it is preferable that the atmosphere should be purged with an oxygen-free gas as a gas at latest right before the indwelling device 101, 102, 201 or 301 for treating flora is supplied to the appendico 19. Examples of the oxygen-free gas include carbon dioxide gas, nitrogen gas and a noble gas.

In the stage from insertion of the endoscope 1 from the anus 11 to arrival at the intestinal cecum 18, either an oxygen-containing gas or an oxygen-free gas may be used.

Using an oxygen-containing gas has an advantage that the number of indigenous bacteria in the large intestine 10 can be reduced. Examples of the oxygen-containing gas include air. Using an oxygen-free gas has an advantage that replacement of the gas to another type of gas is not required.

In step (C), the position of the appendiceal opening 19i is determined as shown in FIG. 11.

(Step (C) of Determining the Position of the Appendiceal Opening)

The position of the appendiceal opening 19i is determined by looking through the field of view of the observation section 3 of the endoscope 1.

In step (D), the probiotics 100 are supplied to the appendico 19, as shown in FIG. 12.

(Step D of Supplying Probiotics to Appendico and Step K of Introducing Probiotics in Appendiceal Lumen)

The indwelling device 101, 102, 201 or 301 for treating flora is introduced in the appendico 19.

A method for introducing each of the indwelling devices 101, 102, 201 and 301 for treating flora according to the first to third embodiments is not particularly limited.

In the case of each of the indwelling devices 101, 102 and 201 for treating flora according to the first and second embodiments, a catheter 500 is inserted through the endoscope channel 2 as shown, for example, in FIG. 12 and each of the indwelling device 101, 102 and 201 for treating flora may be delivered to the appendico 19 through the catheter 500.

The indwelling device 101, 102 or 201 for treating flora, and a treatment tool is inserted in this order in the endoscope channel 2 and may be delivered to the appendico 19 by use of the treatment tool.

Alternatively, the indwelling device 101, 102 or 201 for treating flora may be inserted in the endoscope channel 2 and pushed out from the tip of the endoscope by application of air pressure to deliver to the appendico 19.

Alternatively, the indwelling device 101, 102 or 201 for treating flora may be attached to the tip of an endoscope, and the tip of the endoscope allowed to move closer to the appendico 19 to deliver the indwelling device 101, 102 or 201 for treating flora to the appendico 19.

The probiotics 100 are previously loaded on the indwelling device 101, 102 or 201 for treating flora. Alternatively, after the carrier 110 or 210 is introduced into the appendico 19, the probiotics 100 may be supplied to the appendico 19 and carried in the carrier 110 or 210.

In the case of the indwelling device 301 for treating flora of the third embodiment, the catheter 500 may be inserted through the endoscope channel 2 as shown, for example, in FIG. 12, and the probiotics 100 are delivered to the appendico 19 through the catheter 500, and then, gel-like probiotics 100 may be delivered to the appendico 19 through the catheter 500.

Alternatively, after the catheter 500 is inserted through the endoscope channel 2, as shown in FIG. 12 and the probiotics 100 are delivered to the appendico 19 through the catheter 500, a treatment tool covered with a sheet-like cover 310 may be inserted in the endoscope channel 2 to cover the probiotics 100 with the cover 310.

Finally, the endoscope 1 is removed from the body in step (M).

(Step (M) of Removing Endoscope from the Body)

If a flexible endoscope is used, the endoscope 1 is removed from the body by pulling out.

If a capsule endoscope is used, the endoscope may be evacuated by natural excretion or guiding it by use of a guidance device placed outside the body towards the colon, rectum or anus.

Another Example of Fourth Embodiment

In addition to a series of steps (A), (B), (C), (D/K) and (M) according to the fourth embodiment shown in FIG. 1, at least one of steps (Q), (R), (E) or (F) may be carried out. If step (F) is employed, step (G) may be further carried out.

(Step (Q): Positioning)

Figure 13:
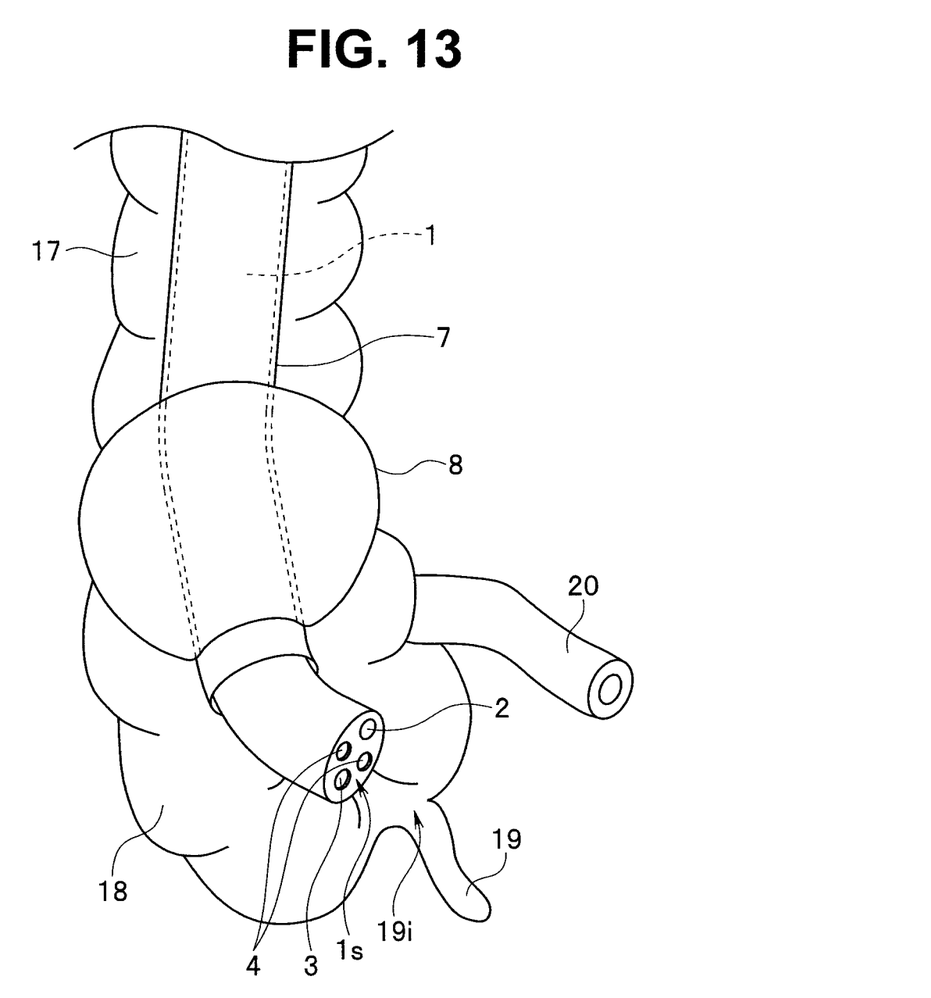
FIG. 13 is a diagram showing step (Q) of FIG. 8.

FIG. 13 shows step (Q) of FIG. 8.

At step (C) of determining the position of the appendiceal opening 19i by the endoscope 1, the endoscope 1 may be positioned in step (Q), as shown in FIG. 13.

Positioning is carried out by stabilizing the distance between the endoscope 1 and the appendico 19 by inflating a balloon 8 provided to a sliding tube 7, as shown in FIG. 13.

As another method for positioning, the endoscope 1 may be allowed to adhere to the intestinal tract by releasing a gas from the lumen up to negative pressure. The gas can be released from the intestine by use of, for example, an air supply and water supply pipeline of the endoscope 1.

(Step (E) of Washing the Interior of the Appendico)

Before step (D) of supplying the probiotics 100 to the appendico 19, the interior of the appendico 19 may be washed in step (E).

The interior of the appendico 19 is washed by supplying a fluid to the interior of the appendico 19. When a gas is used as the fluid, if the bacteria of the appendico 19 to be removed are anaerobic bacteria, an oxygen-containing gas is preferably supplied. Note that a liquid is used as the fluid, saline or mucin is preferably used.

A fluid may be supplied by use of an air supply and water supply pipeline of the endoscope 1 or the endoscope channel 2. If the sheath is used in combination, a fluid may be supplied by use of a channel of the sheath. A fluid may be supplied through a treatment tool or a tube inserted through the endoscope channel 2 or through a catheter inserted separately from the endoscope 1.

(Step (F) of Removing Mucosal Fluid of the Appendico)

Prior to step (D) of supplying the probiotics 100 to the appendico 19, the mucosal fluid 64 (hereinafter referred to as the appendiceal mucosal fluid 64) of the appendico 19 may be removed in step (F).

In step (F), the appendiceal mucosal fluid 64 can be removed from the whole or part of the appendico 19.

As the appendiceal mucosal fluid 64, both of an outer mucus layer 61 and an inner mucus layer 62 (see FIG. 1) may be removed and preferably the outer mucus layer 61 is removed while leaving the inner mucus layer 62.

The appendiceal mucosal fluid 64 may be removed with, e.g., a mucolytic agent, saline containing an abrasive, an abrasive or a laser; pressured water; or by mucosal fluid remover such as a spoon, a stick, a spatula, a brush or a cotton-like member.

The agents and tools may be used in combination. For example, a sharp spoon, brush, spatula or cotton-like member having an abrasive applied on the surface, can be used. Alternatively, a brush, spatula or cotton impregnated with a mucolytic agent can be used.

When only the outer mucus layer 61 of the appendiceal mucosal fluid 64 is removed by a tool such as a sharp spoon, a brush, a spatula or a cotton-like member, the tool is preferably formed of a member, which is more flexible than the inner mucus layer 62 and harder than the outer mucus layer 61.

When only the outer mucus layer 61 of the appendiceal mucosal fluid 64 is removed by a spatula, the spatula preferably has a rough surface having a difference in height lower than the thickness of the outer mucus layer 61. The difference in height is preferably 1 mm or less, and more preferably, 0.7 mm or less.

When only the outer mucus layer 61 of the appendiceal mucosal fluid 64 is removed by a blush, the length of bristles of the brush is preferably shorter than the thickness of the outer mucus layer 61. The length of bristles is preferably 1 mm or less, and more preferably, 0.7 mm or less.

Step (F) of removing the appendiceal mucosal fluid 64 may be carried out together with step (E) of washing the interior of the appendico 19.

In this case, the order of carrying out step (F) and (E) is not particularly limited and appropriately selected depending on the state of the appendico 19 of the patient. At least one of the steps may be repeated for a plurality of times, for example, in the order of step (E)→step (F)→step (E).

Step (R) of inserting a small-diameter endoscope in the appendico 19 in advance to observe the interior of the appendico 19. After the small-diameter endoscope is removed from the appendico 19 and the endoscope 1, step (E) of washing the interior of the appendico 19 or step (F) of removing the appendiceal mucosal fluid 64 may be carried out. Before step (R) of inserting a small-diameter endoscope into the appendico 19, step (Q) of positioning the endoscope 1 may be carried out.

The appendico 19 varies in shape, thickness and length, depending on the living body. Because of this, the shape and depth of the appendico 19 are not determined just by observing the appendiceal opening 19*i* through observation section 3. If the small-diameter endoscope is used, step (E) of washing the interior of the appendico 19 and step (F) of removing the appendiceal mucosal fluid 64 can be easily carried out.

(Step (G) of Staining Appendiceal Mucous Membrane)

Before step (F) of removing the appendiceal mucosal fluid 64, step (G) of staining the appendiceal mucosal fluid 64 may be carried out. If the mucosal fluid is stained, it is easily to determine the thickness of the mucosal fluid and the amount of mucosal fluid removed.

Although the dye for staining the mucosal fluid is not particularly limited, for example, Alcian Blue may be mentioned.

For staining the appendiceal mucosal fluid 64, a dye for staining mucosal fluid may be loaded in a mucosal fluid remover or may be sprayed by use of, e.g., a channel of the mucosal fluid remover, the endoscope channel 2 or a channel of a sheath.

Implementation of the Fourth Embodiment

The fourth embodiment may be carried out singly or in combination of endoscopy or an endoscopic therapy such as polypectomy.

Post Treatment According to the Fourth Embodiment (Step (H) of Warming the Appendico from the Body Surface and Step (I) of Vibrating the Appendico from the Body Surface)

After step (D) of supplying the probiotics 100 to the appendico 19, step (H) of warming the appendico 19 from the body surface or step (I) of vibrating the appendico 19 from the body surface, may be carried out.

Step (H) or step (I) may be carried out before or after step (M) of removing the endoscope 1 from the body.

For warming the appendico 19 from the body surface in step (H), a method of warming the whole or part of the body known in the technical field may be employed. For example, a method of using bathing, wet pack, hot-water bag, hot stone, far-infrared irradiation or hyperthermia may be mentioned.

For vibrating the appendico 19 from the body surface in step (I), a method known in the technical field can be employed. For example, a method of using hyperthermia, massager or air-bubble bath may be mentioned.

If step (H) or (I) is carried out, the probiotics 100 can be diffused in the appendico 19 or penetrate into the mucosal fluid 64.

(Step (Z) of Taking the Probiotics or Nutrient for the Probiotics)

After implementation of step (M), (H) or (I), step (Z) of taking the probiotics 100 is preferably carried out.

If the probiotics 100 are taken in the condition where the viable number of bacteria in the appendico 19 is low, there is a high probability that flora constituted of the probiotics 100 is formed in the appendico 19.

In step (Z), an oral agent or a suppository may be used.

Examples of dosage form of the probiotics 100 employed in step (Z) include a powder containing the probiotics 100, a tablet containing the probiotics 100, a capsule encapsulating the probiotics 100, and a fluid containing the probiotics 100. Examples of the fluid include degassed water, carbonated water, mucin, collagen, hyaluronic acid, yogurt, milk, and juice.

Examples of nutrients for the probiotics 100 include a compounds such as ferrous sulfate, manganese sulfate, magnesium sulfate, sodium acetate, ammonium citrate, potassium dihydrogen phosphate, glucose or tryptone; yeasts, lactic acid bacteria, butyric acid bacteria and bifidobacteria. As the yeasts, lactic acid bacteria, butyric acid bacteria or bifidobacteria, it is preferred to use killed bacteria or live bacteria weaker than the probiotics 100 to be colonized in the appendico or weakened live bacteria.

(Step (V) of Restoring Enteric Environment)

After implementation of the fourth embodiment, a enteric environment restoration treatment for returning the enteric environment to the environment before the fourth embodiment, may be carried out.

For example, it is conceivable that after the absorption rate of nutrient by a healthy body is improved in order to withstand a severe living environment, the enteric environment restoration treatment of step (V) is carried out with a change in living environment, as described in the section of the subject to which the present invention is applied.

Examples of the enteric environment restoration treatment of step (V) include dietary restriction, injection of a medical agent, colonic irrigation and removal of intestinal mucosal fluid. Specific processes of these treatments are the same as the processes in the pretreatment steps (b), (c), (d) and (e) described later.

Examples of the enteric environment restoration treatment of step (V) further include transplantation of feces of a relative or a housemate or substances in the intestine of the subject taken before implementation of the fourth embodiment. The fecal transplantation may be carried out in combination with dietary restriction, injection of a medical agent, colonic irrigation or removal of intestinal mucosal fluid.

Pretreatment According to the Fourth Embodiment (Step (a): Appendiceal Formation)

A person with appendectomy of the appendico 19 for the reason of, e.g., appendiceal dysplasia or appendicitis, or a person having deteriorated immune function of the appendico 19 due to aging may undergo appendico-plasty for forming the appendico 19 before implementation of the fourth embodiment.

Figure 14:
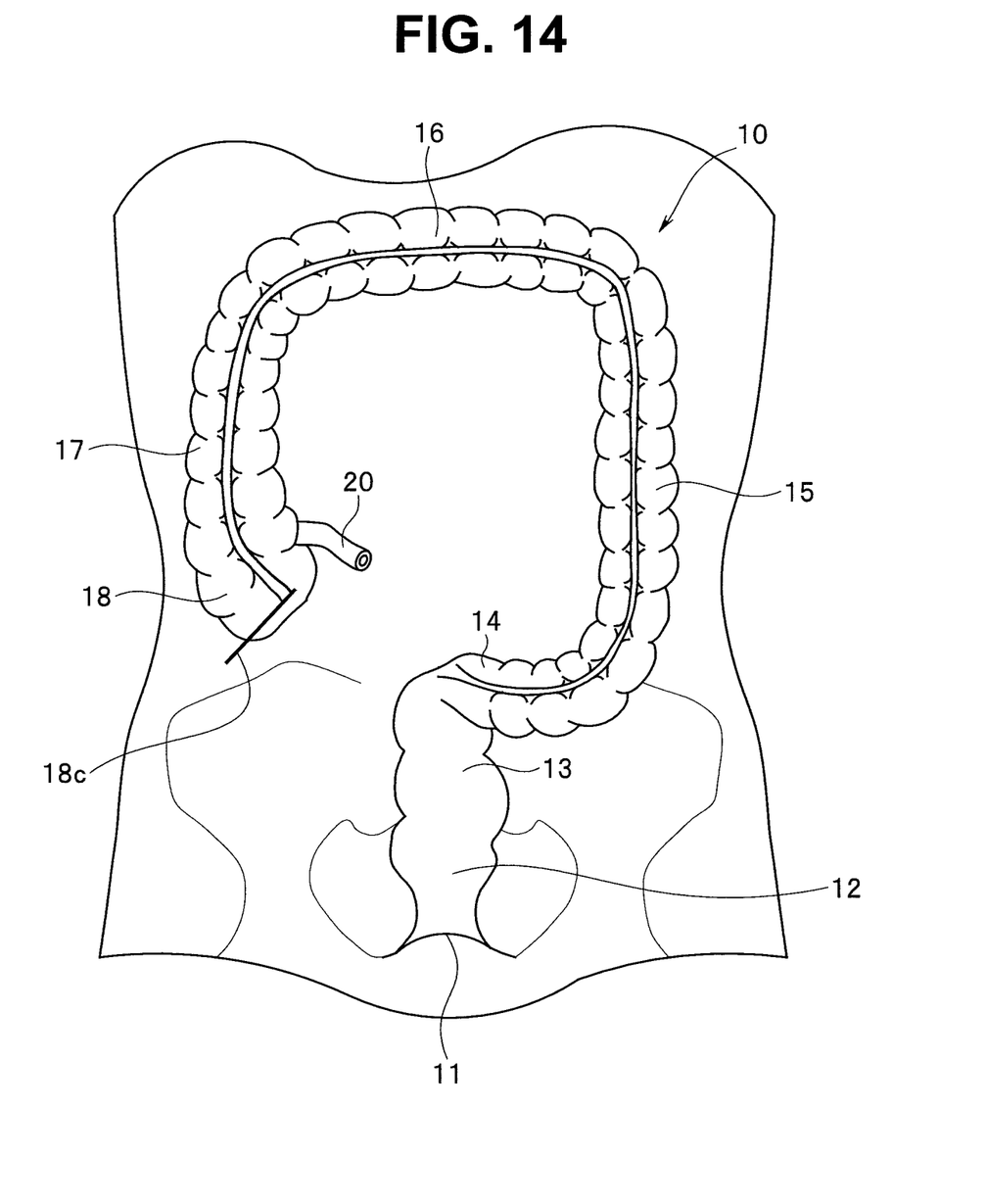
FIG. 14 is a diagram showing a state in which a part of the intestinal cecum is incised and
FIG. 15 is a diagram showing that the incision shown in FIG. 14 is sewed to form the appendico.
Figure 15:
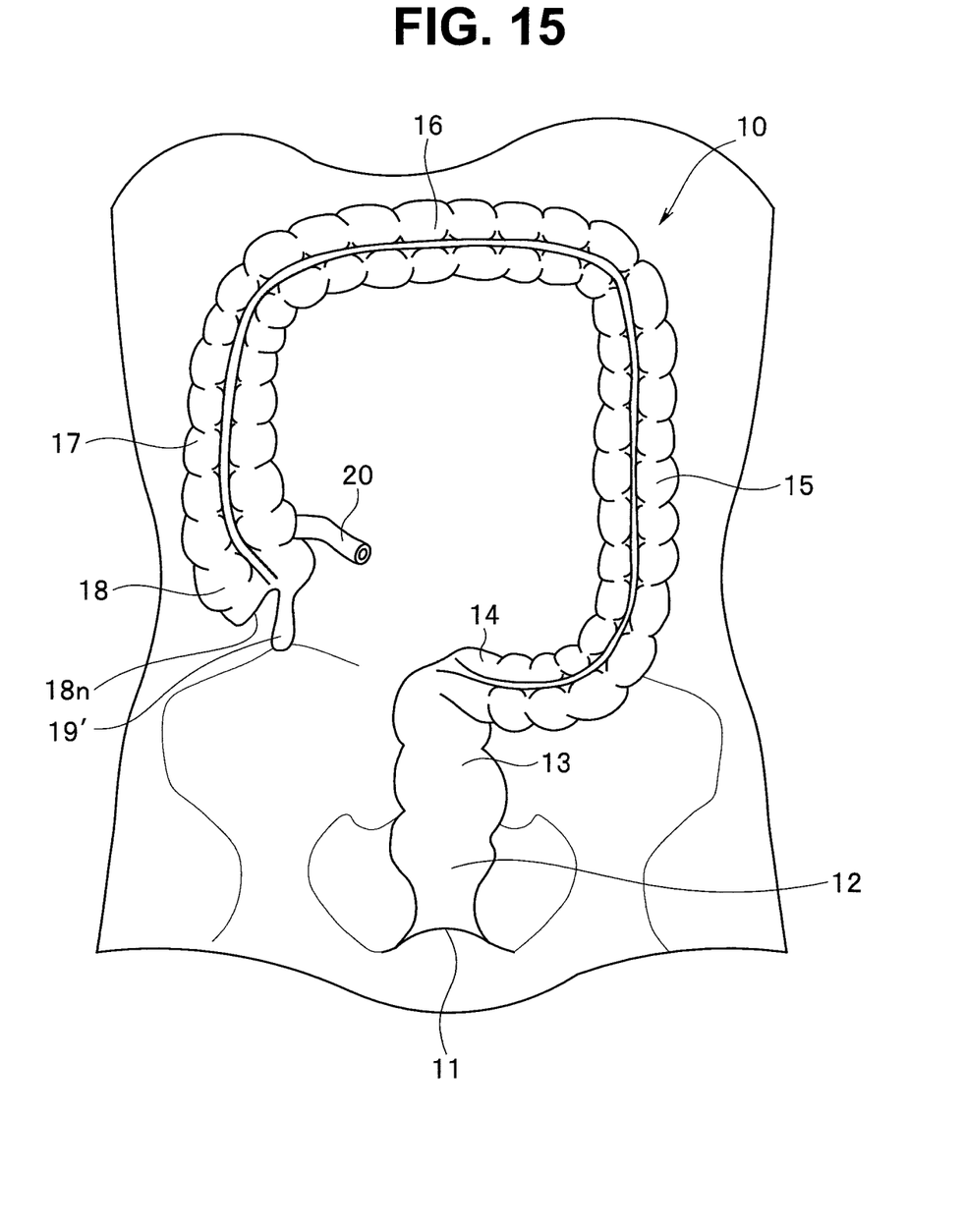

FIG. 14 shows a state in which a part of the intestinal cecum is incised. FIG. 15 shows that the incision shown in FIG. 14 is sewed to form the appendico.

The appendico may be formed by abdominal surgery or laparoscopic surgery.

Examples of a method for forming the appendico 19, include but are not particularly limited to, a "method of forming the appendico 19 by making an incision 18c partly in the intestinal cecum 18 and suturing the incision", as shown in FIG. 14 and FIG. 15; a "method of transplanting a diverticulum formed in the intestinal tract"; a "method of transplanting a part of the intestinum jejunum, which is formed by excising the part of the intestinum jejunum and closing one of the ends of the excised portion"; a "method of gradually growing the appendico 19 in vivo by placing an instrumentarium for forming the appendico in the intestinal cecum 18; and a "method of transplanting the intestine including at least the appendico 19". As the instrumentarium for forming the appendico, for example, an instrumentarium used in the tissue/expander method can be applied.

In the case of the method of forming the appendico 19 by making an incision 18c partly in the intestinal cecum 18 and suturing the incision 18n, or method of transplanting a part of the intestinum jejunum, the muscular layer may be partly removed. If suturation is employed for forming the appendico, suturation can be made with needle and thread or clip, stapler, heat fusion or heat fusion in combination with ultrasonic vibration.

Before formation of the appendico, a flexible endoscope is inserted inside the body to determine a part suitable for forming the appendico. In this case, for example, the positions of the Peyer's patches in the intestine are determined, and a portion containing Peyer's patches at a predetermined rate may be determined as candidate formation site of the appendico.

(Step (b): Dietary Restriction)

Before implementation of the fourth embodiment, the number of enterobacteria may be reduced by dietary restriction.

The period of the dietary restriction can be appropriately set.

The dietary restriction may be carried out by stop eating, restriction of caloric intake, or taking food that hardly nourishes bacteria.

(Step (c): Intake of Medical Agent)

Before implementation of the fourth embodiment, a medical agent for reducing the number of enterobacteria may be taken.

The medical agent may be subcutaneously injected, orally taken, administered as a suppository or administered by inhalation through the trachea.

The medical agent may be an antibiotic substance or allicin directly acting on bacteria or a laxative acting on the intestine.

(Step (d): Colonic Irrigation)

Before implementation of the fourth embodiment, the interior of the intestine may be washed by introducing a liquid from the anus 11.

Examples of the liquid to be used for washing the intestine include, but are not particularly limited to, saline, oxygen saturated water and degassed water. The liquid may contain a medical agent for reducing the number of enterobacteria.

Colonic irrigation may be carried out by use of a plurality of types of liquids. For example, a liquid containing a medical agent for reducing the number of bacteria is used for washing, and then, saline may be used for rinsing.

(Step (e): Removal of Intestinal Mucosal Fluid)

Before implementation of the fourth embodiment, mucosal fluid of the large intestine 10 or the small intestine may be at least partly removed.

The mucosal fluid can be removed in accordance with the method employed in step (H) of removing the appendiceal mucosal fluid.

(Step (f): Oral Intake of Protected Probiotics)

Before implementation of the fourth embodiment, the protected probiotics 100 may be orally taken.

The term "protected" herein means that the probiotics 100 are protected and delivered to the intestinal tract such that the probiotics 100 cannot be killed with the digestive juice.

The "protected probiotics" refer to encapsulated, coated probiotics 100 or enclosed probiotics 100 in a bag. The probiotics 100 may be taken in accordance with step (Z) of taking the probiotics 100.

The timing of oral intake of the protected probiotics 100, is not particularly limited as long as the protected probiotics 100 are already delivered to the intestinal tract at the time the endoscope 1 is manually operated and may be appropriately selected depending on, e.g., the protection form, physical condition, physical size, age, type of manual operation, and timing to apply a manual operation.

The amount and frequency of intake of the protected probiotics 100 are not particularly limited and appropriately selected depending on, e.g., protection form, physical condition, physical size, age, type of manual operation, and timing to apply a manual operation.

Steps (b), (c), (d), (e) and (f) may be carried out in combination.

(Other Pretreatments)

Before implementation of the first to third embodiments, indigenous bacteria in the intestine may be collected, cultured and analyzed. Based on the analysis results, bacterium deficient in the intestine or a bacterium compatible with indigenous bacteria may be selected and used as the probiotics in the present invention.

(Subject to which the Present Invention is Applied)

The treatment for flora by the present invention is applicable to all age groups, preferably a subject having the appendico 19 of less than 30 years.

Since fibrosis does not progress and lymphocytes are active in the less than 30 years-old appendico 19, the effect of the treatment of the invention is easily obtained. The intestinal tract including the appendico 19 is preferably not less than 10 years old. The intestinal tract of not less than 10 years old has strong enough to easily introduce the endoscope 1 to the intestinal cecum 18.

The present invention can be applied to treatment for allergies. Examples of the allergies include hay fever, atopic dermatitis, animal allergies, food allergies, sick building syndrome, ulcerative enteritis and Crohn disease.

The present invention can be applied to treatment for drug-induced enterocolitis. The present invention can be applied to enhancement of immunity before endoscopy and endoscopic treatment.

The present invention can be applied for health care. Examples of health care include obesity treatment, cholesterol reduction and improvement of metabolic rate.

The present invention can be applied to inborn error of metabolism. The present invention can also be applied to treatment for malabsorption syndrome and improvement of nutrient absorption rate of a healthy body. Examples of malabsorption syndrome include postgastrectomy syndrome, short bowel syndrome, celiac disease and amyloidosis.

The present invention can be applied to improvement in nutrient absorption rate of a healthy body. Examples of the healthy body in need of such treatment include bodies of persons who withstand a severe living environment, such as an athlete, an alpinist and military personnel.

The present invention is not limited to the embodiments and modified embodiments and can be variously modified and carried out within the scope of the invention.

What is claimed is:

1. An indwelling device for treating flora, the indwelling device comprising:
    a carrier comprising a first region configured to be disposed in an appendico and a second region configured to be disposed further on an intestinal cecum side than the first region;
    probiotics, and
    an antibacterial agent;
    wherein
    the probiotics are carried in the first region, and
    the an antibacterial agent is carried in the second region;
    wherein the second region is separately formed from the first region;
    the first region of the carrier is a first indwelling device carrying the probiotics, and
    the second region of the carrier is a second indwelling device containing the antibacterial agent and the second region is arranged at an exit of the appendico.

2. The indwelling device according to claim 1, wherein each of the first region and the second region further carry a bioabsorption, and
    the second region has a higher bioabsorption rate than a bioabsorption rate of the first region.

3. The indwelling device according to claim 1, wherein the first region is gelatinous.

4. The indwelling device according to claim 1, wherein the first region contains mucin.

5. The indwelling device according to claim 1, wherein the first region contains a nutrient for the probiotics.

6. The indwelling device according to claim 5, wherein the nutrient is at least one selected from a group consisting of ferrous sulfate, manganese sulfate, magnesium sulfate, sodium acetate, ammonium citrate, potassium dihydrogen phosphate, glucose, tryptone, yeast, lactic acid bacteria, butyric acid bacteria, and bifidobacteria.

7. The indwelling device according to claim 2, wherein a mass of the second region is smaller than a mass of the first region.

8. The indwelling device according to claim 2, wherein a molecular weight of the second region is smaller than a molecular weight of the first region.

9. The indwelling device according to claim 2, wherein a degree of crosslinkage of the second region is smaller than a degree of crosslinkage of the first region.

* * * * *